(12) United States Patent
Harrington

(10) Patent No.: US 8,410,973 B2
(45) Date of Patent: Apr. 2, 2013

(54) ACTIVATING MOTION DETECTORS

(75) Inventor: Donald E. Harrington, Moorpark, CA (US)

(73) Assignee: The Boeing Company, Chicago, IL (US)

(*) Notice: Subject to any disclaimer, the term of this patent is extended or adjusted under 35 U.S.C. 154(b) by 218 days.

(21) Appl. No.: 12/913,473

(22) Filed: Oct. 27, 2010

(65) Prior Publication Data

US 2011/0227779 A1 Sep. 22, 2011

Related U.S. Application Data

(60) Provisional application No. 61/315,064, filed on Mar. 18, 2010.

(51) Int. Cl.
*G01S 13/00* (2006.01)

(52) U.S. Cl. .......................... 342/28; 342/27

(58) Field of Classification Search ............. 342/13, 342/27, 28
See application file for complete search history.

(56) References Cited

U.S. PATENT DOCUMENTS

| | | | | |
|---|---|---|---|---|
| 5,334,974 A * | 8/1994 | Simms et al. | | 340/990 |
| 5,497,149 A * | 3/1996 | Fast | | 340/988 |
| 5,550,551 A * | 8/1996 | Alesio | | 342/457 |
| 5,731,757 A * | 3/1998 | Layson, Jr. | | 340/573.1 |
| 5,808,564 A * | 9/1998 | Simms et al. | | 340/990 |
| 5,903,217 A * | 5/1999 | Stanczak et al. | | 340/554 |
| 6,239,736 B1 * | 5/2001 | McDonald et al. | | 342/28 |
| 6,518,915 B2 * | 2/2003 | Schutz et al. | | 342/28 |
| 6,559,775 B1 * | 5/2003 | King | | 340/932.2 |
| 6,687,609 B2 * | 2/2004 | Hsiao et al. | | 701/517 |
| 6,780,660 B2 * | 8/2004 | Hamamura et al. | | 438/17 |
| 6,999,041 B2 * | 2/2006 | Holly | | 343/820 |
| 7,069,111 B2 * | 6/2006 | Glenn et al. | | 700/245 |
| 7,106,203 B2 * | 9/2006 | Edwards et al. | | 340/573.1 |
| 7,142,147 B2 * | 11/2006 | Holly | | 342/13 |
| 7,423,576 B2 * | 9/2008 | Sahinoglu et al. | | 342/27 |
| 7,675,423 B2 * | 3/2010 | Boling et al. | | 340/573.1 |
| 7,760,137 B2 * | 7/2010 | Martucci et al. | | 342/357.39 |
| 7,884,727 B2 * | 2/2011 | Tran | | 340/573.1 |
| 8,004,451 B2 * | 8/2011 | Wu et al. | | 342/27 |
| 2002/0060639 A1 * | 5/2002 | Harman | | 342/28 |
| 2002/0109624 A1 * | 8/2002 | Schutz et al. | | 342/28 |
| 2004/0183670 A1 * | 9/2004 | Ferrara | | 340/539.1 |
| 2007/0066311 A1 * | 3/2007 | Reibel et al. | | 455/445 |
| 2008/0036594 A1 * | 2/2008 | Kates | | 340/541 |
| 2008/0055154 A1 * | 3/2008 | Martucci et al. | | 342/357.1 |
| 2008/0186135 A1 * | 8/2008 | Boling et al. | | 340/7.51 |
| 2009/0233715 A1 * | 9/2009 | Ergen et al. | | 463/41 |
| 2010/0250460 A1 * | 9/2010 | Twitchell, Jr. | | 705/332 |
| 2010/0302090 A1 * | 12/2010 | Wu et al. | | 342/160 |
| 2011/0148689 A1 * | 6/2011 | Filippi et al. | | 342/28 |
| 2012/0013508 A1 * | 1/2012 | Bao et al. | | 342/450 |

* cited by examiner

*Primary Examiner* — Jack W Keith
*Assistant Examiner* — Peter Bythrow
(74) *Attorney, Agent, or Firm* — Yee & Associates, P.C.

(57) ABSTRACT

A method and apparatus for activating a motion detector. An electromagnetic signal is transmitted in a form of a beam. The beam is configured to activate the motion detector when the beam encounters the motion detector. The beam is moved to a location in which the motion detector is present such that the motion detector activates.

19 Claims, 4 Drawing Sheets

ACTIVATING MOTION DETECTORS

RELATED PROVISIONAL APPLICATION

This application is related to and claims the benefit of priority of provisional U.S. patent application Ser. No. 61/315,064, filed Mar. 18, 2010, entitled "Activating Motion Detectors", which is incorporated herein by reference.

GOVERNMENT LICENSE RIGHTS

This application was made with Government support under contract number N00174-08-C-0031 awarded by the United States Navy. The Government has certain rights in this application.

BACKGROUND INFORMATION

1. Field:

The present disclosure relates generally to motion detectors and, in particular, to a method and apparatus for activating motion detectors. Still more particularly, the present disclosure relates to a method and apparatus for activating motion detectors to determine whether a working motion detector is present.

2. Background:

A motion detector is a device that contains a mechanism that quantifies motion. For example, a motion detector can transform the detection of motion into an electrical signal.

This type of motion detector typically measures optical, thermal, or acoustical changes in an area around the motion detector. The area that the motion detector detects motion is also referred to as a field of view. Many motion detectors can detect motion at a distance from about 50 feet to about 80 feet.

A motion detector may be used to control the operation of a device. For example, a motion detector may initiate the operation of the device, stop the operation of the device, or change the manner in which the device operates.

Motion detectors have a number of different uses. For example, motion detectors are used in buildings to open automatic doors. As another example, motion detectors may be used to turn on lights, activate escalators, turn off water sprinklers, and provide other suitable operations.

Additionally, motion detectors also are used to alert an organization to a presence of people in different areas. For example, motion detectors may be used in a security system to detect a presence of unauthorized people in a particular location.

Although motion detectors are useful, these types of systems do require maintenance. For example, if a motion detector fails to function as desired, then the particular system the motion detector is desired to control may not be operated as desired. In this situation, the motion detector is reworked or replaced.

For example, if a motion detector used to control lights is not functioning as desired, lights may not turn on or turn off as desired. As another example, if a motion detector does not work properly, a person may have to slow down or stop before entering a building with a door opened by a motion detector. In this case, the motion detector operates, but not as desired. The motion detector does not detect the person far enough away to open the door in a manner that avoids the person having to slow down or stop. In these situations, the motion detector may require reworking or replacement. Reworking may involve changing the sensitivity of the motion detector.

Accordingly, it would be advantageous to have a method and apparatus which takes into account one or more of the issues discussed above, as well as possibly other issues.

SUMMARY

In one advantageous embodiment, an apparatus comprises a transmitter system and a controller. The transmitter system is configured to transmit electromagnetic signals in the form of a beam. The controller is configured to cause the transmitter system to transmit the beam such that a motion detector is activated when the beam encounters the motion detector.

In another advantageous embodiment, a method is present for activating a motion detector. An electromagnetic signal is transmitted in a form of a beam. The beam is configured to activate the motion detector when the beam encounters the motion detector. The beam is moved to a location in which the motion detector is present such that the motion detector activates.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. For example, the different advantageous embodiments recognize and take into account that in performing maintenance, it is often desirable to determine whether motion detectors are working as desired. In other words, motion detectors may be tested to determine whether they become activated in the desired circumstances. For example, the motion detectors may be tested to determine whether they activate, whether they activate within a certain distance, whether they activate within a certain field of view, and other suitable situations in which motion detectors are activated.

One manner in which motion detectors can be tested involves having personnel test each motion detector. With this type of testing, a person moves into each area in which a motion detector is present. When the person moves into the area, a determination is made as to whether the device operated by the motion detector is activated in response to motion by the person. This determination may be made by seeing whether the device operates. For example, lights may turn on, a panel may indicate the presence of motion, or some other suitable operation.

The different advantageous embodiments recognize and take into account that this type of testing of motion detectors, however, is time consuming. The testing requires a person to move to each area in which a motion detector is present.

Thus, the advantageous embodiments provide a method and apparatus for activating a motion detector. This activation is used to cause the device connected to the motion detector to operate. In this manner, one or more of the different advantageous embodiments may be used to determine whether a motion detector is operating.

In one advantageous embodiment, an apparatus comprises a transmitter system and a controller. The transmitter system is configured to transmit electromagnetic signals in the form of a beam. The controller is configured to cause the transmitter system to transmit the beam such that a motion detector is activated when the motion detector encounters the beam.

Figure 1:
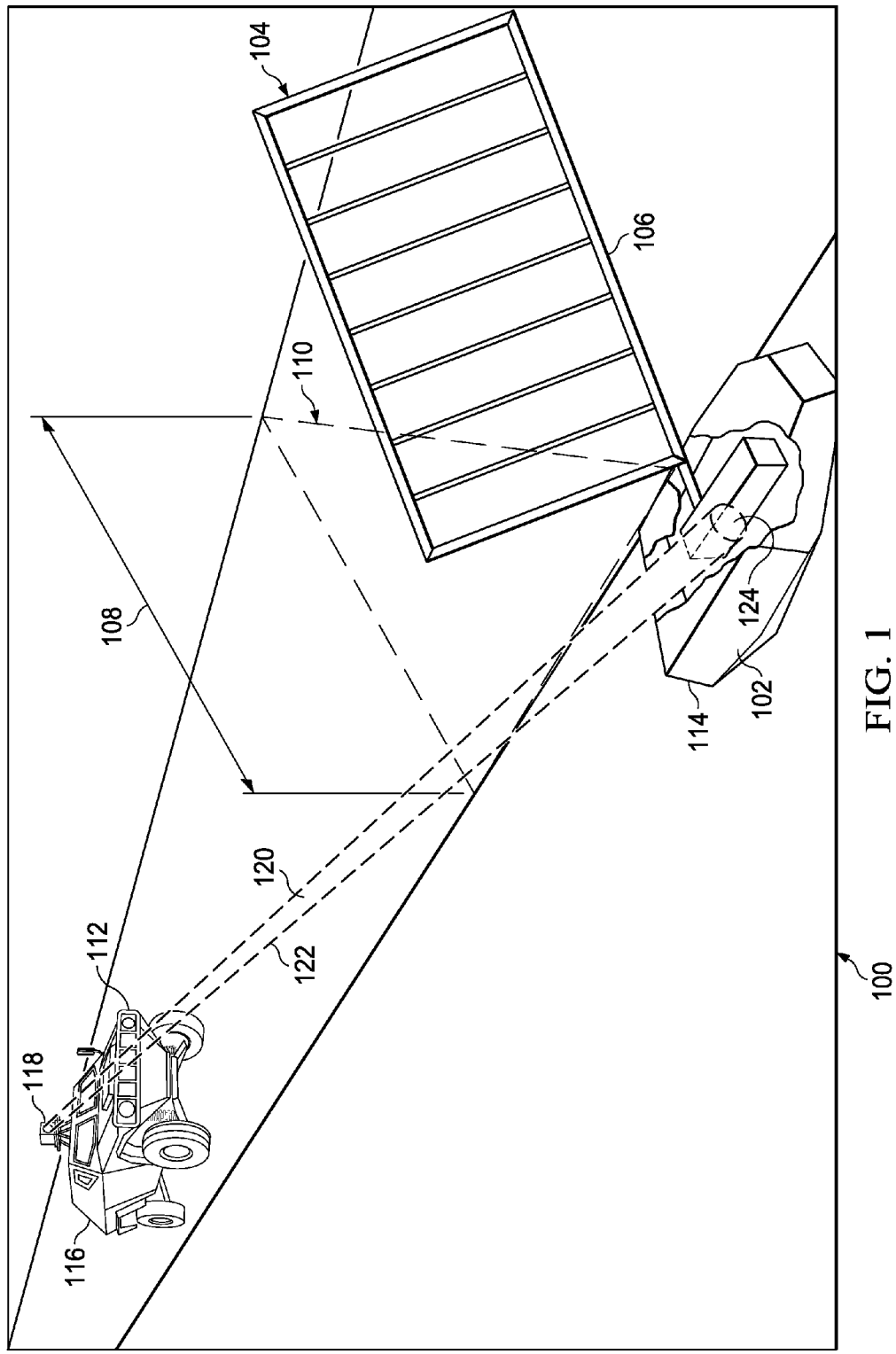
FIG. 1 is an illustration of a motion detector environment in accordance with an advantageous embodiment.

With reference now to FIG. 1, an illustration of a motion detector environment is depicted in accordance with an advantageous embodiment. In this illustrative example, motion detector environment 100 includes motion detector 102 and device 104. In this example, device 104 takes the form of powered gate 106. Motion detector 102 is connected to powered gate 106 and moves powered gate 106 when an object is detected within selected distance 108 and field of view 110 of motion detector 102.

Activation system 112 may be used to detect the presence of motion detector 102 in location 114 or test the operation of motion detector 102 in location 114. In this illustrative example, activation system 112 comprises vehicle 116 with transmitter 118.

Transmitter 118 is configured to transmit electromagnetic signals 120 in the form of beam 122. In these examples, beam 122 is a collimated beam. When end 124 of beam 122 reaches motion detector 102 at location 114, motion detector 102 is activated to cause powered gate 106 to move. In this manner, an operator of vehicle 116 may test the operation of motion detector 102 and powered gate 106 without having to move vehicle 116 into a location for detection by motion detector 102.

In this manner, operator of vehicle 116 may test various motion detectors for other devices, such as other powered gates, security systems, and/or other devices more quickly than moving vehicle 116 to the appropriate position within field of view 110. Further, in some cases, testing of motion detectors may require the operator to leave vehicle 116 and move into the desired location.

Figure 2:
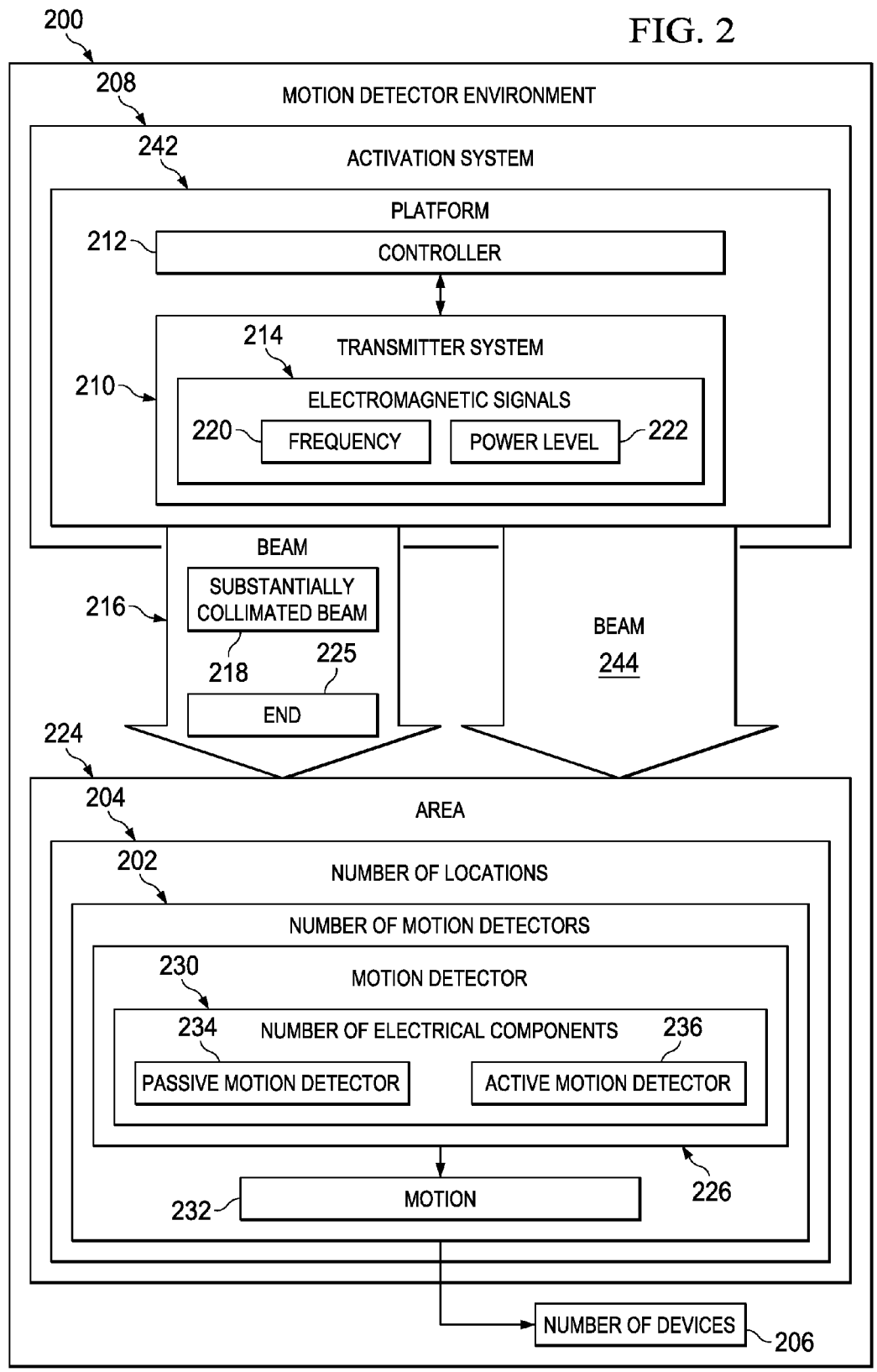
FIG. 2 is an illustration of a motion detector environment in accordance with an advantageous embodiment.

Turning now to FIG. 2, an illustration of a motion detector environment is depicted in accordance with an advantageous embodiment. Motion detector environment 100 in FIG. 1 is an example of one implementation of motion detector environment 200 in FIG. 2. Motion detector environment 200 includes number of motion detectors 202 in number of locations 204. Number of motion detectors 202 is connected to number of devices 206.

As used herein, when a first component is connected to a second component, the first component may be connected to the second component without any additional components. The first component also may be connected to the second component by one or more other components. For example, one electronic device may be connected to another electronic device without any additional electronic devices between them. In some cases, another electronic device may be present between the two electronic devices connected to each other.

In these illustrative examples, activation system 208 may be used to determine whether number of motion detectors 202 in number of locations 204 is working. Further, activation system 208 may be used to detect a presence of number of motion detectors 202 in number of locations 204.

For example, the presence of number of motion detectors 202 in number of locations 204 may be detected when number of devices 206 connected to number of motion detectors 202 begin operating, cease operating, and/or change the manner in which number of devices 206 operate.

In this illustrative example, activation system 208 comprises transmitter system 210 and controller 212. Transmitter system 210 is configured to transmit electromagnetic signals 214 in a manner that activates any of number of motion detectors 202. If any of number of motion detectors 202 do not activate, those motion detectors may be non-operational or not functioning as desired or expected.

In these illustrative examples, transmitter system 210 is configured to transmit electromagnetic signals 214 in the form of beam 216. In particular, beam 216 is substantially collimated beam 218 in these illustrative examples. A substantially collimated beam is a propagation of electromagnetic signals 214 in a beam that travels with substantially diffraction-limited divergence as the beam travels away from the transmitter. In other words, the substantially collimated beam travels with substantially the same diameter or cross-section along the beam. This type of propagation of electromagnetic signals 214 is in contrast to electromagnetic signals 214 radiating in many directions.

Electromagnetic signals 214 have frequency 220 and power level 222. In these illustrative examples, beam 216 may be moved across area 224, which includes number of locations 204. If number of locations 204 is known for number of motion detectors 202 within area 224, beam 216 may be directed at each of number of locations 204 to test number of motion detectors 202.

If number of locations 204 for some or all of number of motion detectors 202 is unknown, beam 216 may be moved to cover area 224. In this manner, a presence of number of motion detectors 202 may be detected. Further, number of locations 204 for number of motion detectors 202 also may be detected by identifying the location of end 225 of beam 216 in area 224.

In these illustrative examples, at least one of frequency 220 and power level 222 for electromagnetic signals 214 in beam 216 are selected such that a motion detector, such as motion detector 226 in number of motion detectors 202 in number of locations 204, is activated when motion detector 226 encounters end 225 of beam 216. In these examples, motion detector 226 includes number of electrical components 230.

At least one of frequency 220 and power level 222 are selected such that electromagnetic signals 214 in beam 216 are coupled to number of electrical components 230.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

This coupling of electromagnetic signals 214 to number of electrical components 230 is in a manner that activates motion detector 226. The activation of motion detector 226 is an activation indicating that motion 232 has been detected by motion detector 226.

In these illustrative examples, motion detector 226 may be passive motion detector 234, active motion detector 236, and/or a combination of the two. Passive motion detector 234 may use infrared sensors. Active motion detector 236 may use sensors that detect ultrasonic and/or microwave signals that may be emitted by active motion detector 236.

The illustration of motion detector environment 200 in FIG. 2 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, transmitter system 210 may transmit electromagnetic signals 214 in the form of two beams. For example, electromagnetic signals 214 may form beam 216 and beam 244. Beam 216 and beam 244 may be directed at different locations in area 224.

In yet other advantageous embodiments, beam 216 and beam 244 may overlap at a location in area 224. In still other advantageous embodiments, beam 216 and beam 244 may have different frequencies. Difference frequency is the difference between beam 216 and beam 244. The difference frequency may be the frequency selected to cause electromagnetic signals 214 to couple with number of electrical components 230 in these illustrative examples.

In still other illustrative examples, activation system 208 also may include platform 242. Platform 242 may be associated with activation system 208 in transmitter system 210. For example, without limitation, platform 242 may be a moving platform, a stationery platform, a vehicle, a truck, a helicopter, an aircraft, a portable housing, a building, or some other suitable type of platform.

Figure 3:
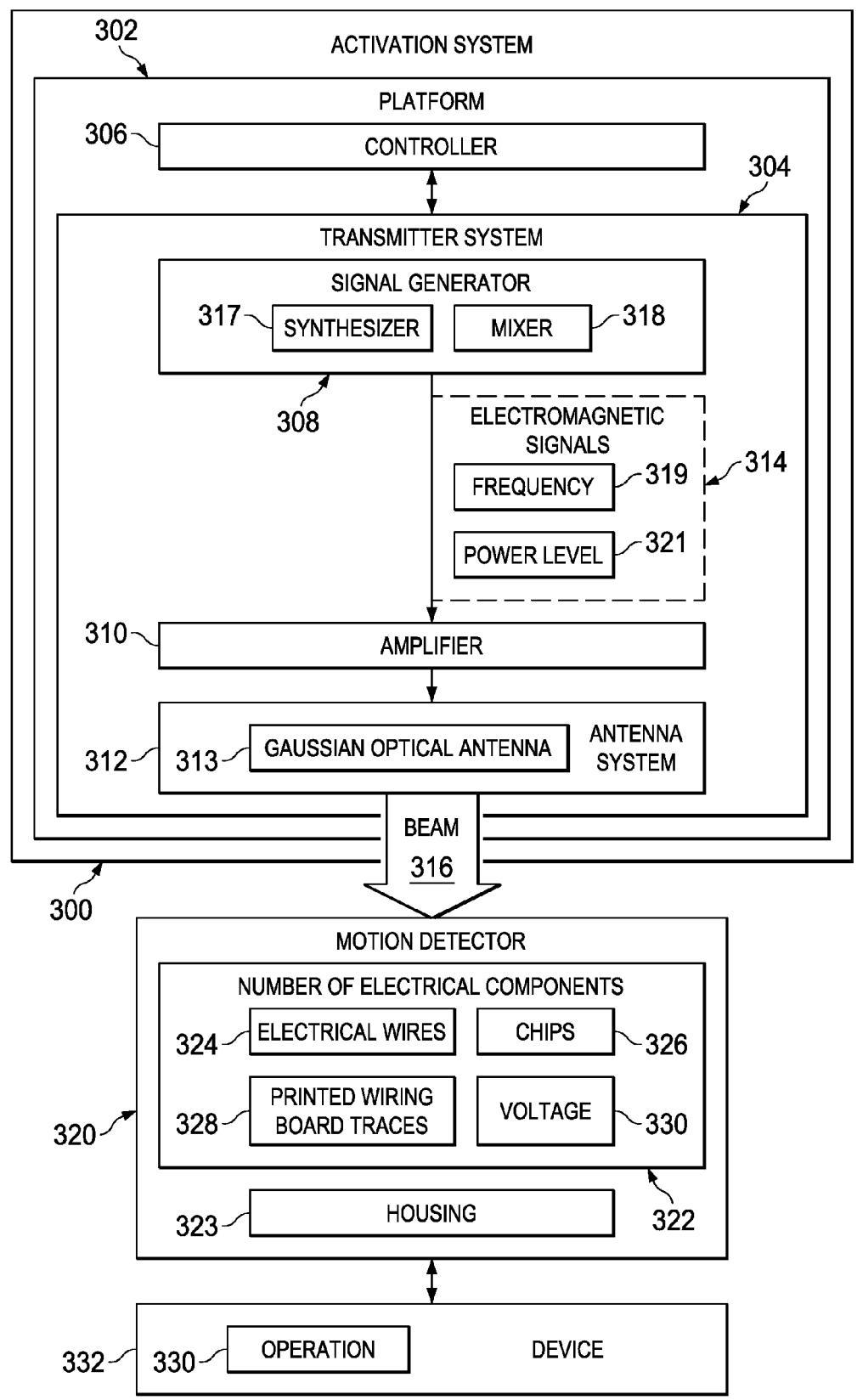
FIG. 3 is an illustration of an activation system in accordance with an advantageous embodiment.

With reference now to FIG. 3, an illustration of an activation system is depicted in accordance with an advantageous embodiment. In this illustrative example, activation system 300 is an example of one implementation of activation system 208 in FIG. 2. As depicted, activation system 300 includes platform 302, transmitter system 304, and controller 306. Transmitter system 304 and controller 306 are associated with platform 302.

A first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

In this example, transmitter system 304 includes signal generator 308, amplifier 310, and antenna system 312. Signal generator 308 is connected to antenna system 312 through amplifier 310. Signal generator 308 generates electromagnetic signals 314. Amplifier 310 amplifies electromagnetic signals 314. In turn, electromagnetic signals 314 are sent to antenna system 312, which transmits electromagnetic signals 314 as beam 316.

Signal generator 308, in these illustrative examples, may be implemented using a number of different components. For example, without limitation, signal generator 308 may be implemented using synthesizer 317 and mixer 318.

In these illustrative examples, controller 306 may be implemented using a number of different devices. For example, controller 306 may comprise at least one of a processor unit, an application specific integrated circuit, or some other suitable device. A processor unit may have one or more microprocessors. For example, a processor unit may be a multi-core processor or some other suitable type of processing system.

In these illustrative examples, controller 306 controls transmitter system 304 to control at least one of frequency 319 and power level 321 of electromagnetic signals 314. Of course, controller 306 also may control other characteristics of electromagnetic signals 314. For example, a phase of electromagnetic signals 314 also may be controlled.

In these illustrative examples, signal generator 308 generates electromagnetic signals 314 with frequency 319 from about 75 GHz to about 110 GHz. This type of signal generator is also referred to as a W-band RF signal generator.

In these examples, antenna system 312 may be implemented using Gaussian optical antenna 313. This type of antenna transmits electromagnetic signals 314 in the form of beam 316 having a substantially collimated form. In other words, beam 316 is a substantially collimated beam in these examples.

In these illustrative examples, when beam 316 encounters motion detector 320, motion detector 320 is activated. In these illustrative examples, motion detector 320 includes number of electrical components 322. Number of electrical components 322 includes, for example, without limitation, at least one of electrical wires 324, chips 326, printed wiring board traces 328, and other suitable types of components.

In this example, voltage 330 in number of electrical components 322 may be changed such that motion detector 320 is activated. In other words, voltage 330 and motion detector 320 may be changed within number of electrical components 322 such that motion detector 320 is activated in the same manner that motion would activate motion detector 320.

Further, electromagnetic signals 314 in beam 316 also may be configured to travel inside of housing 323. For example, electromagnetic signals 314 may be configured to pass through materials forming housing 323. In another example, electromagnetic signals 314 may pass through holes, cracks, seams, or other openings in housing 323. In these illustrative examples, electromagnetic signals 314 may have a power level that takes into account any dissipation in power that may occur when traveling inside of housing 323 such that electromagnetic signals 314 are capable of coupling to number of electrical components 322 in a manner that cause motion detector 320 to become activated.

The voltage entering the comparator may be changed by beam 316 such that the comparator indicates a presence of motion. Of course, with other configurations for other motion detectors, beam 316 may change other electrical characteristics of voltages and/or currents present within motion detector 320.

In this illustrative example, the activation of motion detector 320 causes a change in operation 330 of device 332. Device 332 is connected to motion detector 320. In these illustrative examples, device 332 may be located in the same location as motion detector 320 or in a remote location.

In these illustrative examples, platform 302 may take a number of different forms. For example, platform 302 may be a moving platform, a stationery platform, a vehicle, a truck, a helicopter, an aircraft, a portable housing, a building, or some other suitable type of platform.

For example, chips 326 may include a comparator and motion sensors for use in motion detector 320. For example, a first motion sensor may detect motion in one field of view, while a second motion sensor may detect motion in a second field of view for motion detector 320. A difference in light or heat between the two fields of view may cause a difference in voltage being sent to the comparator. This difference may indicate that motion is present.

The illustration of activation system 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, antenna system 312 may include other types of antennas other than Gaussian optical antenna 313. Additionally, additional numbers of antennas may be present to transmit additional beams, depending on the particular implementation. Further, in some illustrative examples, amplifier 310 may be implemented as part of signal generator 308.

Figure 4:
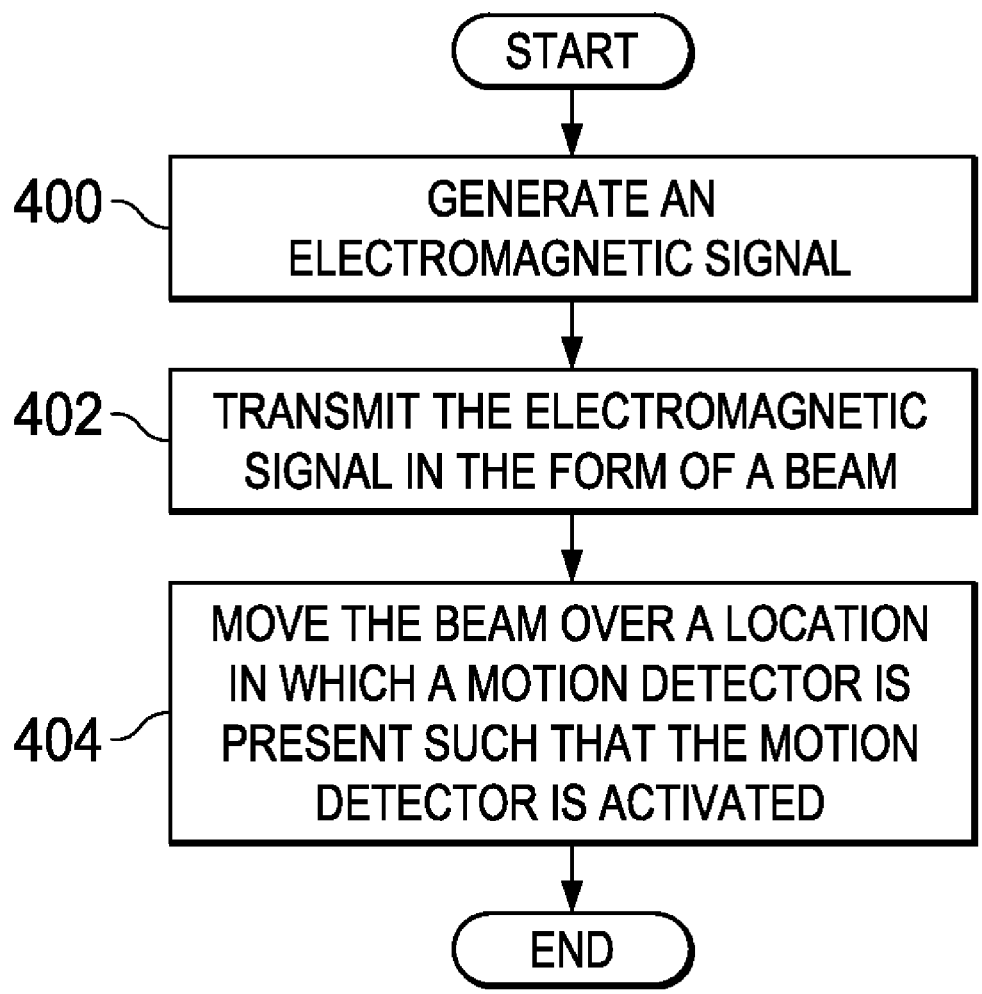
FIG. 4 is an illustration of a flowchart of a process for activating a motion detector in accordance with an advantageous embodiment.

With reference now to FIG. 4, an illustration of a flowchart of a process for activating a motion detector is depicted in accordance with an advantageous embodiment. The process illustrated in FIG. 4 may be implemented in motion detector environment 200 in FIG. 2. In particular, the process may be implemented using activation system 112 in FIG. 1.

The process begins by generating an electromagnetic signal (operation 400). The electromagnetic signal is generated using activation system 112 in FIG. 1. The electromagnetic signal is then transmitted in the form of a beam (operation 402). The beam is configured to activate the motion detector when the beam encounters the motion detector.

The beam may be moved over a location in which a motion detector is present such that the motion detector is activated (operation 404), with the process terminating thereafter. The movement of the beam may be performed by physically moving the antenna system, the platform, or other physical components for the activation system. In other illustrative examples, the movement of the beam may be performed through electronic steering.

Operation 404 may be repeated for a number of different locations. These locations may have motion detectors that are known or are visible to an operator. In some illustrative examples, the locations may or may not have motion detectors. In these situations, the beam may be used to activate motion detectors to identify their presence. The presence of motion detectors may be identified by a device connected to the motion detector beginning operation, ceasing operation, or changing the manner in which the device operates.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for activating motion detectors. In some illustrative embodiments, an apparatus comprises a transmitter system and a controller. The transmitter system is configured to transmit electromagnetic signals in the form of a beam. The controller is configured to cause the transmitter system to transmit the beam such that a motion detector is activated when the beam encounters the motion detector.

In this manner, motion detectors can be activated during testing and discovery operations. For example, motion detectors may be tested to determine whether they activate under desired conditions. Additionally, a location of motion detectors may be identified by activating the motion detectors. The activation of motion detectors causes a device connected to the motion detector to operate. This operation may be used to indicate the presence of a motion detector in the location where the beam is directed.

With one or more of the different advantageous embodiments, testing and locating motion detectors may be performed more easily. For example, an operator may direct a beam from a location over multiple locations to activate motion detectors rather than having to travel to each motion detector individually. Further, motion detectors may be activated in locations that may be more difficult for an operator to reach.

The description of the different advantageous embodiments has been presented for purposes of illustration and description, and is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a transmitter system configured to transmit electromagnetic signals in a form of a beam; and
a controller configured to cause the transmitter system to transmit the beam such that a motion detector is activated when the beam encounters the motion detector, the controller configured to select a number of frequencies for the beam to couple to a number of electrical components in the motion detector and transmit the beam with the number of frequencies such that the beam couples to the number of electrical components in the motion detector in a manner that activates the motion detector when the motion detector device encounters the beam.

2. The apparatus of claim 1, wherein the motion detector is a passive motion detector.

3. The apparatus of claim 1, wherein the transmitter system comprises:
a signal generator configured to generate the electromagnetic signals; and
an antenna system configured to transmit the electromagnetic signals in the form of the beam.

4. The apparatus of claim 3, wherein the signal generator comprises:
a radio frequency generator configured to generate the electromagnetic signal in a form of radio frequency signals having a wavelength from about 75 GHz to about 110 GHz.

5. The apparatus of claim 3, wherein the antenna system comprises a Gaussian optical antenna.

6. The apparatus of claim 1, wherein the beam is a radio frequency beam.

7. The apparatus of claim 1, wherein the beam is a substantially collimated radio frequency beam.

8. The apparatus of claim 1 further comprising:
a platform, wherein the transmitter system and the controller are associated with the platform.

9. The apparatus of claim 8, wherein the platform is selected from one of a moving platform, a stationery platform, a vehicle, a truck, a helicopter, an aircraft, a portable housing, and a building.

10. A method for activating a motion detector, the method comprising:
transmitting an electromagnetic signal in a form of a beam, wherein the beam is configured to activate the motion detector when the beam encounters the motion detector;
moving the beam to a location in which the motion detector is present such that the motion detector activates; and
controlling the transmitting the electromagnetic signal in the form of a beam so as to select a number of frequencies for the beam to couple to a number of electrical components in the motion detector and transmit the beam with the number of frequencies such that the beam couples to the number of electrical components in the motion detector in a manner that activates the motion detector when the motion detector device encounters the beam.

11. The method of claim 10 further comprising:
moving the beam to a number of other locations, wherein a number of other motion detectors in the number of other locations is activated when the beam encounters the number of other motion detectors.

12. The method of claim 10, wherein the step of transmitting the electromagnetic signal in the form of the beam, wherein the beam is configured to activate the motion detector when the beam encounters the motion detector comprises:
generating the electromagnetic signal using a signal generator in a transmitter; and
transmitting the electromagnetic signal as the beam using an antenna system.

13. The method of claim 12 further comprising:
amplifying the electromagnetic signal using an amplifier after generating the electromagnetic signal using the signal generator and before transmitting the electromagnetic signal as the beam using the antenna system.

14. The method of claim 12, wherein the signal generator comprises:
a radio frequency generator configured to generate the electromagnetic signal in a form of radio frequency signals having a wavelength from about 75 GHz to about 110 GHz.

15. The method of claim 12, wherein the antenna system comprises a Gaussian optical antenna.

16. The method of claim 10, wherein the beam is a radio frequency beam.

17. The method of claim 10, wherein the beam is a substantially collimated radio frequency beam.

18. The method of claim 10, wherein the electromagnetic signals are transmitted in the form of the beam using a transmitter system associated with a platform.

19. The method of claim 10, wherein the platform is selected from one of a moving platform, a stationery platform, a vehicle, a truck, a helicopter, an aircraft, a portable housing, and a building.

* * * * *